Sept. 29, 1953 W. C. HUEBNER 2,653,510

APPARATUS FOR HOLDING AND POSITIONING A COMBINED MASK AND SCREEN

Filed Feb. 24, 1951 2 Sheets-Sheet 1

INVENTOR.
WILLIAM C. HUEBNER
BY Hudson, Boughton, Williams, David & Hoffmann
ATTORNEYS INVENTOR.
WILLIAM C. HUEBNER
BY Hudson, Boughton,
Williams, David & Hoffmann
ATTORNEYS Patented Sept. 29, 1953 2,653,510

UNITED STATES PATENT OFFICE 2,653,510

APPARATUS FOR HOLDING AND POSITIONING A COMBINED MASK AND SCREEN

William Carl Huebner, Mamaroneck, N. Y.

Application February 24, 1951, Serial No. 212,623

16 Claims. (Cl. 88—24)

This invention relates to an apparatus for use in making fractional and/or half-tone type exposures of an image on a light-sensitized surface and, more particularly, to an improved apparatus for holding and accurately positioning a combined mask and screen for making such exposures.

The photographic reproduction of an image upon a sensitized surface presents many problems, especially where such reproductions are to be used in printing, and these problems are accentuated when the image is in color and not simply black and white. For example, it is frequently necessary to have a relatively long exposure to bring out details in shadows of an image, while at the same time care must be exercised not to overexpose and thus lose detail in the lighter areas. Also, in preparing color separation members for use in printing by the half-tone process, it is desirable to be able to control both the sizes and the positions of the dots or exposed areas on the sensitized surfaces of the several color separation members relative to each other to provide more authentic color correspondence and prevent moiré pattern and muddy appearance in the composite reproduction. In my prior patents, for example, No. 1,060,982, issued May 6, 1913, and No. 1,780,191, issued November 4, 1930, are disclosed combination mask and screen members having transparent and opaque areas in various predetermined patterns which may be moved to preselected positions for securing fractional exposures and/or to serve as screens in preparation of color separation members. These prior devices have enabled the achievement of greatly improved results in photographic reproduction of images, but with the increased use of color in printing and the demand for finer detail and still greater correspondence with the color of the original image, it has become necessary to effect further improvements in the mode of handling the combined mask and screen members so as to achieve better results with the expenditure of less effort.

An object of this invention is, therefore, to provide an improved apparatus whereby a member, composed of minute alternate transparent and opaque portions, may be both rectilinearly and rotatably shifted to accurately predetermined positions relative to a sensitized surface thus serving either as a fractional mask for sequential exposures of selected areas of the sensitized surface or as a screen in the nature of a half-tone screen for the preparation of either black and white or color separation members capable of utilization in mechanical or electronographic printing operations.

Another object of the invention is to provide an improved apparatus of the type defined in the preceding paragraph and wherein the combined mask and screen member may be positioned at different selected distances from the sensitized surface to provide spaced minute exposed areas of desired sizes, the said mask and screen being so supported as to be capable of being rotated to different angular positions and rectilinearly shifted in any of the different angular positions.

A further object of the invention is to provide an improved apparatus of the type mentioned above in which the combined mask and screen member is composed of opaque lines intersecting at right angles to provide rectangular transparent areas therebetween and the member is so supported as to be rectilinearly shifted in two directions extending at right angles to each other between either of two predetermined positions in each of its directions of movement so that a transparent area may be sequentially moved to four separate positions in juxtaposition with respect to each other and in each such position the previously exposed area of the sensitized surface is covered, whereby four separate exposures of the image to be reproduced can be made upon a single sensitized surface which separate exposures are juxtaposed to provide but one composite image, the areas beneath the transparent portions being exposed to the image which is to be reproduced for either the same or different lengths of time.

A still further object of the invention is to provide an improved apparatus as defined in the preceding paragraph and wherein the mask and screen member may be rotatably adjusted to any desired angular position and locked in that position without interfering with the rectilinear movement thereof.

An additional object of the invention is to provide an improved apparatus as defined in the two immediately preceding paragraphs and in which a means is provided to effect a preselected separation between the combined mask and screen member and a means for holding a body having a sensitized surface, which separation does not, however, affect the mechanism for angularly or rectilinearly moving the mask and screen member.

The invention further resides in certain novel features of the construction and the combinations and arrangements of the parts of the apparatus in which the invention is embodied, and further objects and advantages thereof will be apparent from the following description of the present preferred embodiment of the invention taken in conjunction with the accompanying drawings, in which identical parts in the several views are designated by the same reference characters, and in which.

Figure 1:
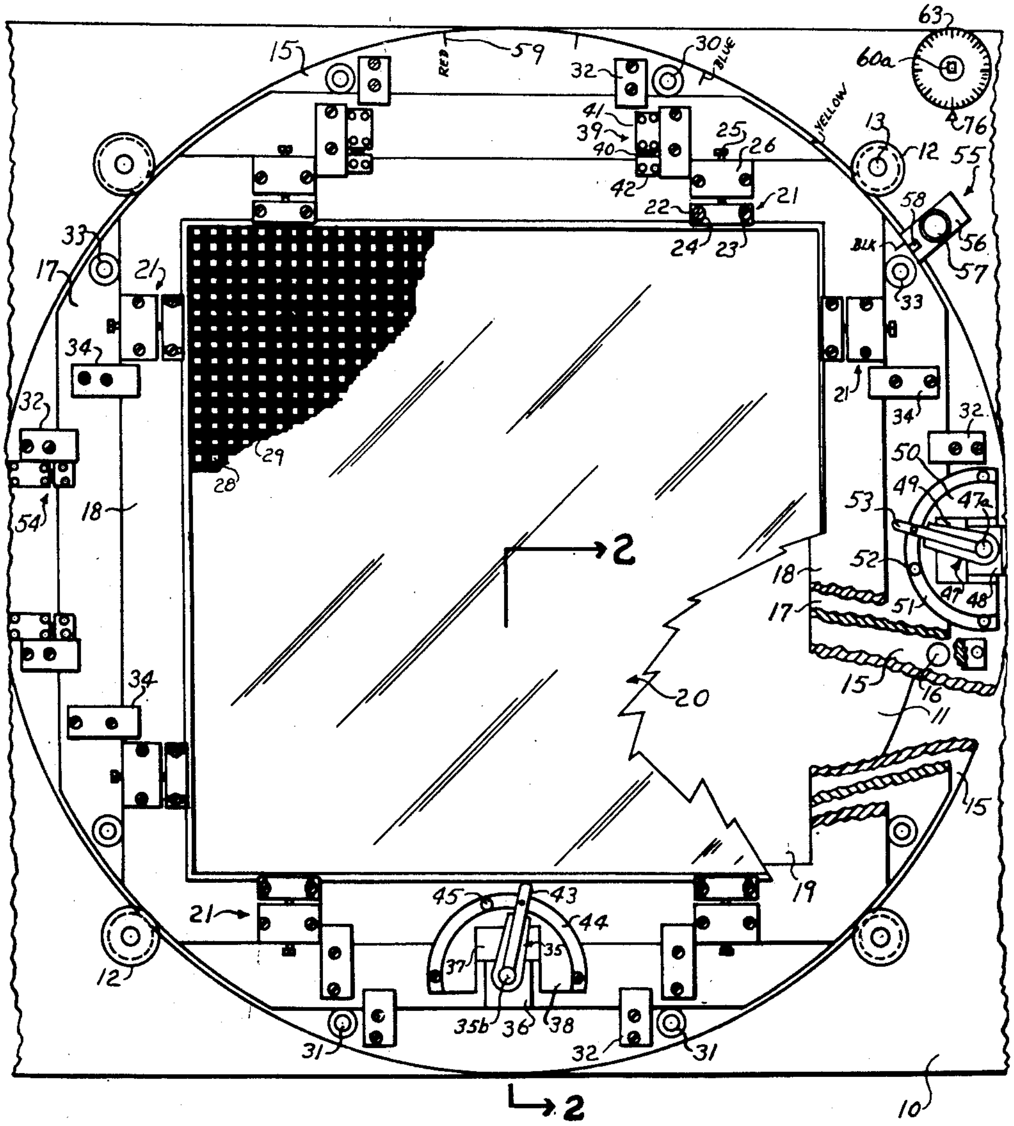
Fig. 1 is a front view principally in elevation but with certain parts broken away and others shown in section to more clearly disclose the construction of the present preferred form of the apparatus, the transparent and opaque portions of the combined mask and screen being illustrated at a greatly enlarged scale in one corner thereof.
Figure 2:
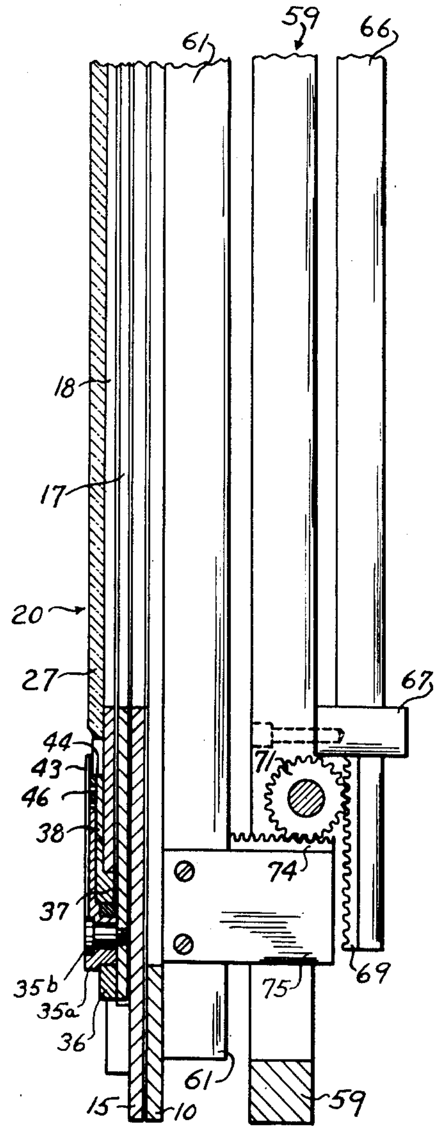
Fig. 2 is a fragmentary sectional view taken substantially on the line 2—2 of Fig. 1 and illustrated on a scale twice that of Fig. 1.
Figure 3:
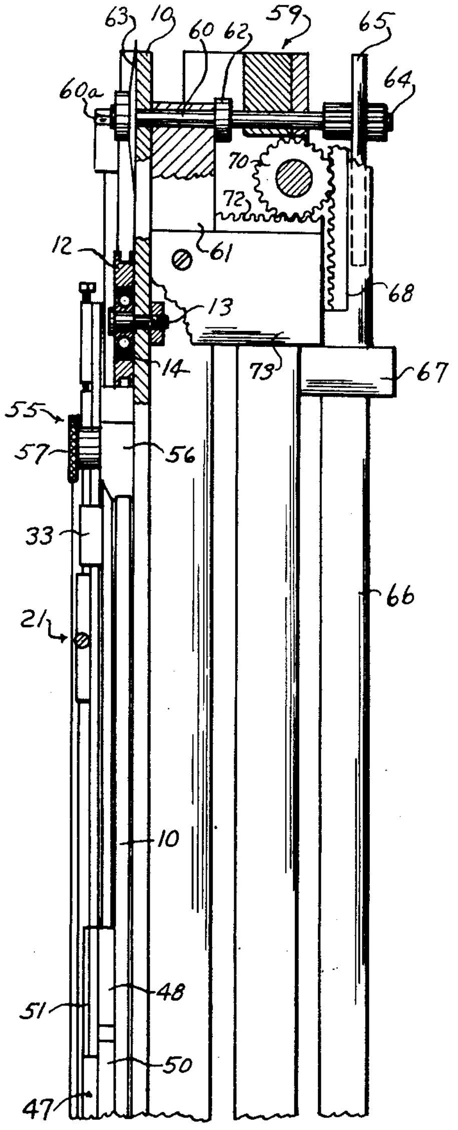

Fig. 3 is a fragmentary view, principally in side elevation, of the apparatus shown in Fig. 1, the view being to the same scale as Fig. 2 with parts broken away and others shown in section; and Figs. 4, 5, 6 and 7 each represent a greatly enlarged elevation of an area of the combined mask and screen illustrating the four separate positions the transparent portion of the selected area may take as a result of rectilinear movement of the screen in two directions at right angles to each other.

The apparatus of this invention for supporting a combined mask and screen is adapted to be used with well-known darkroom type cameras; for example, such as disclosed in my prior Patents 2,406,770, issued September 3, 1946, and 2,458,269, issued January 4, 1949. It is therefore deemed unnecessary to describe the general construction of such cameras and the manner in which the novel apparatus of this invention is supported in operative relationship with the other elements of the cameras since these details may be readily determined by reference to the aforesaid patents. It is to be understood, however, that while the apparatus of this invention is especially suited for use in cameras of the type disclosed in my above-mentioned patents, it is of course not limited to use in such cameras but may be employed in conjunction with other cameras and photographic devices of similar nature.

Referring now first to Figs. 1–3, it will be seen that the apparatus comprises a main frame member 10 which is preferably of plate-like configuration and has a large circular central opening 11. Supported upon one face of the frame member 10 at substantially equally spaced distances and intermediate the central opening and the periphery of the frame are a plurality of rollers 12, four such rollers being shown in the illustrated embodiment. These rollers are rotatably mounted upon studs 13, extending outwardly from the plate 10, and are provided with bearings 14 to permit free rotation of the rollers. The periphery of each roller is grooved and supported in these grooves of the rollers is a circular plate-like member or disk 15 which is therefore freely rotatable relative to the frame member 10. The plate-like member or disk 15 has a rectangular central opening substantially aligned with the circular opening 11 in the frame member 10, thus permitting unimpeded transmission of light therethrough. The forward face of the plate or disk 15 is provided with a plurality of buttons or spacers 16 upon which a pair of superposed members or plates 17 and 18 is slidably supported for rectilinear movement in directions at right angles to each other, as hereinafter described.

The members 17 and 18 have central, rectangularly shaped openings disposed in substantial alignment with respect to each other and to the opening through the disk 15. Extending over the central opening 19 of the outermost member 18 is a combined screen and mask member 20 which is removably and adjustably supported on the member 18 by suitable means generally designated 21. In the illustrated embodiment, the mask and screen supporting members 21 each comprise an adjustable block 22 having elongated slots 23 in which are positioned screws 24 that are threaded into tapped openings of the member 18. The edge of each block or member 22 adjacent the combined mask and screen 20 is undercut to engage over the adjacent edge of the mask and screen, which edge is here shown as bevelled, so that the blocks 22 removably securely hold the combined mask and screen in place. In the illustrated embodiment, eight clamping means 21 are employed, two at each side of the opening 19 and the adjustable block 22 of each clamping means 21 can be readily individually moved to and from clamping engagement with the combined mask and screen 20 by actuation of an associated adjusting screw 25 which is threaded through a stationary block 26 secured to the member 18 adjacent each block 22. It will be seen that by such a construction the mask and screen member 20 is supported and accurately positioned with respect to the aligned openings through the members 10, 15, 17 and 18 for control of the passage of light therethrough.

In the illustrated embodiment, the combined mask and screen 20 is formed of a transparent plate 27 of glass or similar material on which are provided a series of opaque lines intersecting at right angles and which lines are equally spaced from each other with the spacing between the lines equal to the thickness of the lines. There is thus provided a combined mask and screen having uniformly spaced, rectangular, transparent portions 28 representing one-fourth of the total area of the member 20 with the remaining three-fourths of the area of the said member being opaque as indicated at 29, the opaque portions resulting from the said intersecting lines. The opaque portions of the screen and mask member 20 can be formed in any suitable manner as, for example, by scribing the surface of the plate 27 with a dividing engine, by photographic reproduction, or by other suitable means as will be readily apparent to those skilled in the art.

The widths or thicknesses of the lines comprising the opaque portions 29, and which correspond with the widths of the transparent portions 28 of the combined mask and screen member 20, will of course be selected in accordance with the nature of the work for which the mask and screen member is to be utilized and it is for this reason that the said mask and screen member is made removable. By way of example but without limitation thereto and solely to show the order of the size of the lines and transparent openings, one suitable member 20 as 120 lines to the inch so that the distance between longitudinal centers of the lines is .008″ with each line and transparent area having a width of .004″. While the combined mask and screen has been shown as formed of glass with opaque lines provided thereon, it will be evident that it might also be possible to employ a member in which the transparent areas are openings between solid opaque portions, as, for example, by having the lines provided in the form of intersecting wires with the transparent portions being the openings therebetween.

As mentioned heretofore, the members or plates 17 and 18 are supported for rectilinear movements at right angles to each other and this enables the screen and mask member 20 to be correspondingly moved to thus dispose the transparent portions 28 successively in alignment with different areas of a sensitized surface positioned adjacent thereto, as will be hereinafter described. For this purpose, the disk 15 is provided with two pairs of spaced rollers 30, 31 in rolling contact with opposite edges of the plate 17, in this case the upper and lower edges as viewed in Fig. 1. Consequently, the plate 17 is guided for rectilinear movement transversely of the disk 15. The plate 17 is prevented from displacement away from the surface of the disk 15, as well as being additionally guided in its movements, by blocks 32 secured to the disk 15 and having the forward edges undercut to engage over the adjacent edges of the member or plate 17 in sliding relationship. The plate 18 is supported upon the plate 17 and guided for rectilinear movement at right angles thereto by means of spaced rollers 33 and guide blocks 34 disposed adjacent the vertical edges of the plate 18, as viewed in Fig. 1, and supported upon the plate 17, thus supporting and guiding the plate 18 in a similar manner to that in which the plate 17 is supported and guided. It will be apparent from the construction just described that, as viewed in Fig. 1, the plate 17 may move horizontally a limited amount but cannot move vertically, while the plate 18 may move vertically but cannot move horizontally.

Figure 4:
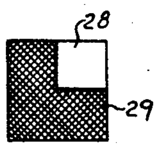
Figure 5:
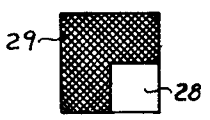
Figure 6:
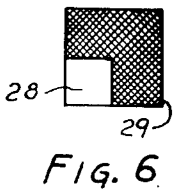

Each of the members or plates 17 and 18 is adapted to be moved in its respective rectlinear direction between either of two predetermined locations or positions so that the transparent areas 28 of the member 20 can each assume four different positions in exact juxtaposed relationship with the result that four movements of the screen and mask member 20 permit a complete exposure of a sensitized surface placed adjacent the said screen and mask member by four separate exposures therethrough. For example, a given transparent area 28, in the position of the members 17 and 18 illustrated in Fig. 1, may occupy a position as shown in Fig. 4. By moving the member 18 vertically to its other position, this transparent portion 28 can be made to move to a position vertically below its previous position and in exact juxtaposed relationship with respect thereto as is indicated in Fig. 5. For the latter position of the member 18, the given transparent portion 28 can be made to assume the position as indicated in Fig. 6 by moving the member 17 from its position shown in Fig. 1 to the other of its two predetermined positions, while leaving member 17 in this last-mentioned position, and returning member 18 to the position illustrated in Fig. 1 will move the given area 28 to the position illustrated in Fig. 7. Consequently, the member 20 can thus be used as a mask for producing a complete exposure of a sensitized surface by moving the mask member 20 to each of the positions just mentioned and effecting an exposure therethrough so that the complete exposure of the entire sensitized surface is in the form of four separate juxtaposed exposures. Any suitable means may be employed for supporting the sensitized surface relative to the mask 20 during such operations, but where the surface is a film, it is desirable to place the latter and the mask member 20 in contact during the exposures. One suitable means for effecting this is the apparatus shown in my prior Patent 2,139,956 issued December 13, 1938, although it will be understood that other apparatus may be utilized for this purpose.

In order to effect the above-mentioned movement of the member or plate 18 to and from its predetermined positions, the member or plate 17 rockably supports a cam means which is operative upon the lower edge of the member 18, as viewed in Fig. 1, to effect movement of the said member. As illustrated, an arm 35 has a hub portion 35*a* provided with an eccentric bore which is rockable upon a stud 35*b* mounted upon the member 17 adjacent the lower edge of the member 18. The hub 35*a* of the arm 35 is rockable in the bore of a block 36 so that rocking of the arm causes movement of the block 36 relative to the plate 17. The upper edge of the block 36 bears against a second block 37 which in turn engages the lower edge of the member or plate 18 so that, as the arm 35 is rocked, rectilinear movement is imparted to the member 18 in a vertical direction as viewed in Fig. 1. In order to restrict the movement of the block 37 to movement in the rectilinear direction just mentioned, the latter is received in and guided by a rectangular opening in an arcuate member 38 supported upon the member or plate 17 and having a portion overhanging the member or plate 18. Adjacent the upper edge of the member 17, opposite the motion producing means just described, are disposed a pair of resilient means, generally designated 39, acting upon the member 18 to return the latter to its initial position when permitted by rocking of the arm 35. As illustrated, the resilient means 39 each comprise a compression coil spring 40 supported between suitable members 41 and 42 carried by the members 17 and 18, respectively.

The arm 35 has an elongated portion 43 of reduced thickness which cooperates with the arcuate member 38 to provide a means for accurately determining, by touch, the position at which the member 18 is located and the proper extent of movement of the member 18 to dispose it at the other of its two predetermined positions, it being remembered that the apparatus is intended for used in a darkroom as part of a camera. For this purpose, the member 38 is provided with an arcuate segment 44 having two spaced bores 45 therein with which a pin or projection 46 on the portion 43 of arm 35 is adapted to be selectively engaged, the portion 43 having sufficient resiliency to permit removal of the pin 46 from one opening 45 and re-engagement with the other opening when the arm 35 is arcuately moved to slide the pin or projection over the surface of the segment 44. The distance between the two spaced openings 45 is so related to the eccentricity of the hub 35*a* of the arm that the movement imparted to the member 18, when the portion 43 is moved from one to the other of the holes 45 is exactly equal to the width of a transparent portion 28 of the combined mask and screen member 20. Thus, the member 20 can be accurately moved vertically, as viewed in Fig. 1, a distance equal to the width of a transparent portion 28. Moveover member 18 is locked in either of its two positions through the cooperation of the pin 46 with an opening 45.

The member 17 is provided with a similar positioning and locking means comprising an arm 47 having a hub rockably supported on the disk 15 by a stud 47*a*. The stud 47*a*, like the stud 35*b*, is eccentrically disposed with respect to the hub of arm 47 and the hub is rockable in the bore of a block 48 which engages with a block 49 cooperating with an edge of the member 17 to effect rectilinear movement of the latter at right angles to the rectilinear movement of member 18. Movement of the block 49 is constrained to a rectilinear direction by being slidably received in a rectangular opening in an arcuate member 50, corresponding with the previously described member 38. The member 50 carries an arcuate portion 51 having a pair of spaced bores 52 with which a pin or projection on an elongated extension portion 53 of arm 47 cooperates to locate and lock the arm 47 in either of two predetermined positions. The opposite edge of the member 18 is acted upon by resilient means 54 similar to the means 39 and comprising coil springs tending to urge the member 17 to the right, as viewed in Fig. 1, thus returning the member 17 to its initial position when permitted by rocking of the arm 47. The spacing between the openings 52 and the eccentricity of the hub of arm 47 are such as to impart a rectilinear movement to the plate 17 a distance equal to the width of a transparent portion 28 of the combined mask and screen member 20 so that the transparent portions of the latter can be moved, as before described, between two juxtaposed positions. This movement may be readily effected in the dark and the position of the member 17 determined solely by the sense of touch. Moreover, the member 17 and arm 47 are locked in either predetermined position since arm 47 and the openings 52 cooperate in the same manner as do the corresponding parts for moving the member 18.

The arcuate members 44 and 51 are made removable, as, for example, by being secured by screws or the like to the members 38 and 50, respectively. This enables ready replacement of the arcuate portions 44 and 51 by others having the spacing between their openings, such as 45 and 52, of different dimensions, which dimensions correspond with the dimensions of the transparent openings 28 in different mask and screen members 20 which may be utilized. That is to say, when the mask and screen member 20 is replaced by another having its opaque and transparent portions of different dimensions from those of the member previously used, the arcuate members 44 and 51 must likewise be replaced so that the movements imparted to the combined mask and screen will be of proper extent to dispose the transparent portions in juxtaposition when in their several predetermined positions. While only the arcuate portions 44 and 51 need to thus be changed so that the members such as 38 and 50 may remain in place, in some instances it may be desirable to make the arcuate portions and the corresponding members 38, 50 removable together, in which event the portions 44 and 51 may be integral with the corresponding members 38 and 50, respectively. Moreover, while the extent of movement of the combined mask and screen member 20 in the two rectilinear directions is preferably equal to the transverse dimension of a transparent portion of the member 20, it will be apparent that the same result is achieved if the movements of the members 17 and 18 be equal to the width of such transparent openings multiplied by an odd integer. In such an event any given transparent opening will take up successive positions which are not adjacent each other but which are spaced from each other by predetermined multiples of its width. It will be readily seen, however, that the four positions of the arms 35 and 47 will still provide four positions of the mask and screen member 20 such that a sensitized surface adjacent thereto can have four fractional exposures thereon, which taken together will comprise one composite exposure of the entire surface.

In addition to the above mentioned rectilinear movements of the member 20, the latter may also be rotated to any desired angular position, since it will be remembered that the disk 15 is rotatably supported upon the frame member 10 by the rollers 12. Moreover, since the above described arms 35 and 47 lock the mask and screen member 20 in an adjusted position, this angular positioning of the disk 15 permits corresponding angular positioning of the member 20 without other movement. Nevertheless, the combined mask and screen member 20 may be moved rectilinearly to any of its four predetermined positions when disposed at any angular position. In order to retain the disk 15, and hence the members 17, 18 and 20 in a desired angular position and to indicate that position, a combined indicating and clamping means 55 is provided upon the frame member 10 adjacent the periphery of the disk 15.

In the illustrated embodiment, this means comprises a block 56 the forward edge of which is adapted to effect a clamping action upon the periphery of the disk 15 when the clamping screw 57, passing therethrough and threaded into the frame member 10 is tightened. The forward edge of the clamping block 56, where it overlies the disk 15, is preferably provided with suitable means cooperating with indicia on the disk 15 to indicate the adjusted position of the latter. Thus, this forward edge of the block 56 is shown as having a notch or recess 58 therein having one side radial with respect to the disk 15 for alignment with radial indicia 59 provided upon the disk.

The indicia 59 may be provided at any desired angularly spaced distances but in the preferred embodiment they are at intervals of 15° to facilitate positioning of the combined mask and screen 20 at angular locations separated from each other by either 15° or 30°. That is to say, when the member 20 is to be used as a screen for reproduction in the half-tone system, it will be spaced from a sensitized surface on which the dots or exposed areas are to be produced and an exposure made with the disk 15 in one predetermined angular position. If the half-tone reproduction is to be in color, successive reproductions of this nature are made for each color, with the use of suitable filters in conjunction with the member 20, and with the latter disposed at different angular positions for each successive color separation exposure. Hence, the resulting exposed portions or areas upon the separate sensitized surfaces, when used together in the composite picture, accurately reproduce the original image and do not improperly combine in the highly objectionable moiré pattern. For example, the disk 15 may be positioned and clamped as shown in Fig. 1 for effecting an exposure through the member 20 for the black portions of an image. The clamp means 55 is then released and the disk 15 rotated 15° to the indicium marked "Yellow" and clamped at that position for effecting the exposure corresponding to that color. Then successive exposures are made for the blue and red components of the image by rotating the disk 15° from the position marked "Yellow" to effect the "Blue" exposure and 30° from the "Blue" to effect the "Red" exposure. In each of the above-mentioned exposures it will be understood that suitable color filters will be employed. If desired, the member 20 may be moved rectilinearly as above described in any of its angular positions, as will now be apparent.

In addition to the above-mentioned movements of the combined screen and mask member 20, it is frequently desirable to vary the separation between the member 20 and the sensitized surface employed therewith to thereby vary the size of the dots or exposed areas formed by the transmission of light through the transparent areas 28 of the member 20. This additional movement may also be readily achieved in the improved apparatus of this invention by operation of a single manually movable member. In the illustrated embodiment, as well be seen especially with respect to Figs. 2 and 3, the frame member 10 together with disk 15, members 17, 18, and the combined mask and screen member 20 are all supported upon a means, generally designated 59, adapted to support a body having a sensitized surface. This means 59 may be of any conventional construction, for example, such as disclosed in my aforementioned Patents 2,406,770 or 2,458,269, and hence the details thereof need not be described. It is sufficient for present purposes to note that this sensitized surface supporting means 59 is suitably supported and normally stationary and hence provisions are made for effecting movement of the frame 10 and the associated mask and screen member 20 relative thereto.

Referring to Fig. 3, it will be seen that the frame member 10 rotatably supports a shaft 60 which extends through the frame member 10 and an attached reinforcing member 61. The shaft 60 is prevented from axial displacement relative to the frame member 10 and the member 61 by having a collar 62 bearing upon the face of the reinforcing member 61 and by having the forward portion of the shaft 60 provided with an indicia-bearing dial 63 so as to be rotatable with the shaft adjacent the forward face of the frame member 10. The forward or outer end of the shaft 60 is formed with a polygonal surface 60*a* for reception of a wrench or other tool by which the shaft may be rotated and the shaft is journalled for rotation and axial movement in the supporting means 59 for the light sensitized surface. The right-hand end of the shaft 60, as viewed in Fig. 3, is provided with an axially elongated pinion 64 which meshes with a rack 65 attached to a vertically extending member or bar 66. The member or bar 66 is guided for vertical movement by bracket members 67, carried by the supporting means 59, and is provided adjacent the top and bottom thereof with racks 68 and 69 which are disposed at right angles with respect to the rack 65. The racks 68 and 69 respectively engage pinions 70 and 71 rotatably supported upon the frame of the supporting means 59. The pinion 70 meshes with a rack 72 connected with a horizontally extending member 73 which, in turn, is connected to the reinforcing member 61 and hence with the frame member 10. The pinion 71 meshes with a rack 74 carried by a horizontally extending member 75 secured to the member 61 adjacent the lower end of the latter, as will be seen in Fig. 2.

It will be evident, therefore, that rotation of the shaft 60 causes vertical movement of the rack 65 and member 66 which, in turn, causes the racks 68 and 69 to rotate the pinions 70, 71 thereby causing rack 72 and 73 to produce horizontal movement of the frame 10, and the combined mask and screen member 20 carried thereby, to and from the supporting means 59. The frame member 10 and the members supported thereon are supported and guided in their movement by having the member 73 slidable upon the upper bracket 67. Suitable slide guide means may also be provided at the other side of the apparatus if necessary or desirable.

The dial 63 is provided with suitable indicia cooperating with a stationary indicium or arrow 76 on the face of the frame member 10 to indicate the distance between the combined mask and screen member 20 and the means 59 for supporting a sensitized surface so that successive exposures of such sensitized surface can be made with different predetermined spacings between the member 20 and the said sensitized surface, and these spacings or separation can be accurately re-established for corresponding successive exposures if desired.

Figure 7:
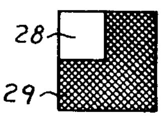

It is believed that the manner in which the apparatus of this invention may be utilized will be readily apparent to those skilled in the art from the above detailed description. Nevertheless, it is desired to emphasize some of the more common uses of the apparatus. For example, the device may be employed with the member 20 utilized as a fractional mask to effect fractional exposures upon a sensitized surface. This may be effected by disposing the apparatus as shown in Fig. 1 with a sensitized surface held substantially in contact with the member 20 by any conventional means, for example, such as disclosed in my prior Patent 2,139,956. With the apparatus thus positioned, an exposure is made, at which time one of the transparent areas or portions 28 will be disposed in the relative position represented by Fig. 4. Then the mask 20 can be moved vertically downwardly a distance equivalent to the width of one of the transparent openings or areas 28 by moving the lever 47 to its second position so that the said one of the transparent portions 28 is as shown in Fig. 5, whereupon a second exposure may be made upon the same sensitized surface. This exposure may, if desired, be timed differently than the first exposure. A third exposure may then be made upon a third unexposed area of the sensitized surface by moving the lever 35 to its second position, thereby placing the said transparent area or portion 28 in a location as represented in Fig. 6. The third exposure may have a time interval still different from either of the two prior exposures or may be the same as either of the prior exposures, depending upon the nature of the effect desired. After this exposure is completed, the mask 20 may be moved to its fourth position by returning the arm 47 to its position as shown in Fig. 1 so that the said transparent area or portion 28 is then at a position as represented in Fig. 7. When this exposure is effected, which may be at any desired time interval, the entire sensitized surface will have been completely exposed with each of the four separate exposures in juxtaposed relationship. It will be understood, of course, that in effecting movement of the mask member 20 relative to the sensitized surface a separation should be introduced therebetween to prevent injury to the sensitized surface, as will be apparent from the disclosure in my prior Patent 2,193,956.

In addition to being employed as a mask for fractional exposures, the apparatus of this invention permits the member 20 to be utilized for forming exposures in the half-tone system of reproduction which is especially advantageous for use in preparing color separation members to be utilized in color printing. When thus employed, the disk 15 of the apparatus is set to a predetermined position corresponding with the color separation member to be prepared, as, for example, at the position shown in Fig. 1, if the black color separation member is to be prepared. In thus employing the member 20, it will normally be spaced from the sensitized surface, the extent of the spacing being preselected and readily achieved for any desired value by means of the dial 63 in conjunction with the stationary indicium 76. The extent of the spacing between the member 20 and the sensitized surface will determine the size of the exposed areas or dots produced while the angular position of the member 20, as effected by moving the disk 15, will enable the separate color separation members to have their exposed areas or dots in positions such that moiré pattern is avoided. It will be evident that in employing the apparatus in this manner the member 20 may be left in any of its rectilinear positions for each of its separate angular positions or it may be moved to any of its four rectilinear positions through manipulation of the arms 35 and 47. Moreover, the separation between the screen 20 and the sensitized surface for any given angular position may be the same or different from that of the separation for other angular positions.

While the invention has been described in considerable detail with respect to one specific embodiment and to various modes in which that embodiment may be utilized, it will be recognized that variations and modifications may be made in both the structure and mode of utilization thereof without departing from the spirit of the invention. Thus, means other than specifically shown and described may be employed for rectilinearly positioning and locking the members 17 and 18 in their predetermined positions. Similarly, mechanism other than the racks and pinions illustrated may be utilized for effecting the desired separation between the combined mask and screen member 20 and the means 59 for supporting the sensitized surface. These and other changes, which are considered equivalents of the construction illustrated and described, are deemed to come within the ambit of the invention. Consequently the invention is not to be considered as limited to the specific details of construction here illustrated and described except as required by the spirit and scope of the appended claims.

Having thus described the invention, I claim:

1. An apparatus of the type described for positioning a combination mask and screen relative to a light sensitized surface comprising a frame member having a central opening, a plate-like member rotatably supported on said frame member and having a central opening superposed with respect to the opening in the frame member, a pair of superposed members having central openings therethrough communicating with each other and with the openings in the said plate-like member and frame member, means movably supporting one of the said pair of members on the other of said pair and the said other of said pair of members on said plate-like member for individual rectilinear movement of said pair of members at right angles relative to each other and parallel to said plate-like member, separate means for effecting rectilinear movement of each of said pair of members a predetermined distance upon each actuation thereof, and means on the said one of said pair of members for supporting a combined mask and screen thereon over the opening therein, whereby the said mask and screen may be sequentially rectilinearly moved relative to the frame member so as to occupy any of four predetermined positions disposed in rectangular arrangement, and the said mask and screen may also be rotated to a desired angular position relative to the frame.

2. An apparatus as defined in claim 1 and wherein the means for effecting rectilinear movement of said pair of members comprise separate means acting on each of said pair of members respectively and normally urging the latter each to a predetermined position thereof, and separate manually operable means for each member of said pair and acting thereon when operated to move the associated member of said pair to another predetermined position thereof.

3. An apparatus of the type described for positioning a combination mask and screen relative to a light sensitized surface comprising a frame member having a central opening, a disk rotatably supported on said frame member and having a central opening superposed with respect to the opening in the frame member, means for releasably locking said disk to said frame member to secure the disk at a selected position, a pair of superposed members having central openings therethrough communicating with each other and with the openings in the said disk and frame member, means supporting one of the said pair of members on the other of said pair and the said other member of said pair on said disk for individual rectilinear movement of said pair of members each between two predetermined positions at right angles relative to each other and parallel to said disk, separate means for effecting movement of each of said pair of members a predetermined distance upon each actuation thereof, and means on the said one of said pair of members for supporting a combined mask and screen thereon over the opening therein, whereby the said mask and screen may be sequentially rectilinearly moved relative to the frame member so as to occupy any of four predetermined positions disposed in rectangular arrangement, and the said mask and screen may also be rotated to and locked in a desired angular position relative to the frame.

4. An apparatus as defined in claim 3 and further comprising cooperating indicia upon said disk and frame member indicating different predetermined angular positions of said disk relative to the frame member.

5. An apparatus of the type described for positioning a combination mask and screen relative to a light sensitized surface comprising a frame member having a central opening, a disk rotatably supported on said frame member and having a central opening superposed with respect to the opening in the frame member, a pair of superposed members having central openings therethrough communicating with each other and with the openings in the said disk and the frame member, means supporting one of the said pair of members on said disk and guiding the said one member for rectilinear movement in a plane parallel to said disk, means on said one member supporting the other of said pair of members thereon and guiding it for rectilinear movements at right angles relative to the said one member and parallel to said disk, means on the said disk engaging the said one of said pair of members to effect rectilinear movement thereof from one to the other of two predetermined positions a fixed distance apart, means on the said one of the pair of members engaging the other member of said pair for effecting rectilinear movement of the said other member relative to said one member from one to the other of two predetermined positions a fixed distance apart, and means on the said other of said pair of members for supporting a combined mask and screen thereon over the opening therein, whereby the said mask and screen may be sequentially rectilinearly moved relative to the frame member so as to occupy any of four predetermined positions disposed in rectangular arrangement, and the said mask and screen may also be rotated to a desired angular position relative to the frame.

6. An apparatus of the type described for positioning a combination mask and screen relative to a light sensitized surface comprising a frame member having a central opening, a disk rotatably supported on said frame member and having a central opening superposed with respect to the opening in the frame member, a pair of superposed members having central openings therethrough communicating with each other and with the openings in the disk and the frame member, means supporting one of the said pair of members on said disk and guiding the said one member for rectilinear movement in a plane parallel to said disk, means on said one member maintaining the other of said pair of members thereon and guiding the said other member for rectilinear movements at right angles relative to said one member and parallel to said disk, means on the said disk engaging the said one of said pair of members to effect rectilinear movement thereof from one to the other of two predetermined positions a fixed distance apart, means to retain the said one member in the position to which it has been moved, means on the said one of the pair of members engaging the other member of said pair for effecting rectilinear movement of the said other member relative to said one member from one to the other of two predetermined positions a fixed distance apart, means to retain the said other member in the position to which it has been moved, and means on the said other of said pair of members for supporting a combined mask and screen over the opening therein, whereby the said mask and screen may be sequentially moved rectilinearly relative to the frame member so as to occupy any of four predetermined positions disposed in rectangular arrangement, and the said mask and screen may also be rotated to a desired angular position relative to the frame.

7. An apparatus as defined in claim 6 wherein the means for moving each of said pair of members each include a cam surface cooperating with the associated member of said pair of members to effect movement thereof in one direction, resilient means normally urging each of said pair of members in the opposite direction, and the means to retain the members of the said pair of members in a given position comprise separate means cooperating with each cam surface to hold it in either of two positions thereof.

8. An apparatus as defined in claim 7 wherein each cam surface is provided by a rockable member having a portion eccentric with respect to its axis of rocking with a separate arm portion connected to each of said rockable members to effect rocking thereof, and the said means to retain a member of said pair of members in a given position cooperates with the associated one of said arm portions.

9. An apparatus as defined in claim 8 and wherein the means cooperating with each of said arm portions to retain it and the associated member of said pair of members in either of two predetermined positions comprises a member normally stationary with respect to the associated arm portions and supported for replacement by a similarly shaped member which is adapted to hold the associated arm portion in two predetermined positions a different distance apart thereby adapting the apparatus for use with a different combined mask and screen.

10. An apparatus of the type described for positioning a combination mask and screen relative to a light sensitized surface comprising a frame member having a central opening, a plate-like member rotatably supported on said frame member and having a central opening superposed with respect to the opening in the frame member, a pair of superposed members having central openings therethrough communicating with each other and with the openings in the said plate-like member and frame member, means supporting one of the said pair of members on the other of said pair and the said other of said pair of members on said plate-like member, means for effecting individual rectilinear movement of said pair of members each between two predetermined positions with the movements being at right angles relative to each other and parallel to said plate-like member, means on the said one of said pair of members for supporting a combined mask and screen thereon over the opening therein, means for removably supporting a body having a light sensitized surface parallel with said frame member, and means for varying the distance between said frame member and the means supporting the said body while maintaining the parallel relationship therebetween, whereby the said combined mask and screen may be sequentially rectilinearly moved relative to the body with the light sensitized surface so as to occupy any of four predetermined positions disposed in rectangular arrangement and the said mask and screen may also be rotated to a desired angular position relative to said body while supported at a desired distance therefrom.

11. An apparatus as defined in claim 10 and further comprising means cooperating with the said distance varying means to indicate the separation between the said frame member and the means for holding a body with a sensitized surface.

12. An apparatus as defined in claim 10 wherein the said means for varying the distance between the body with a light sensitized surface and the combined mask and screen supported on one of said pair of members includes a plurality of spaced motion transmitting members extending in parallel relationship and providing an operative connection between said frame member and the means for supporting the body with the sensitized surface, and means to simultaneously move each of said motion transmitting members.

13. An apparatus of the type described for positioning a combination mask and screen relative to a light sensitized surface comprising a first plate-like member having an opening therethrough, means on said member for removably supporting a combined mask and screen over said opening, a second plate-like member having a central opening, means supporting the first member on the second member and guiding the first member for limited rectilinear movement transversely of said second member and parallel therewith with the openings in said members maintained in communication, a disk having a central opening, means on the said disk supporting the second member thereon and guiding the latter for limited rectilinear movement parallel with said disk and at right angles relative to the movement of said first member with the opening of said disk maintained in communication with the openings of said first and second members, means including a manually rockable eccentric mounted on said second member and cooperating with the first member to effect the rectilinear movement of the latter when the said eccentric is rocked, means including a manually rockable eccentric mounted on said disk and cooperating with the second member for effecting the rectilinear movement of the latter when the last-mentioned eccentric is rocked, a frame member having a central opening, and means rotatably supporting said disk on said frame member with their openings in communication with each other and with the openings in the said first and second members, whereby the said mask and screen may be sequentially rectilinearly moved relative to the frame member so as to occupy predetermined positions disposed in rectangular arrangement and may also be rotated to a desired angular position relative to the frame member.

14. An apparatus as defined in claim 13 and wherein the means for moving the said first and second members each further include means cooperating with the eccentric thereof to locate and retain the latter in either of two predetermined positions each corresponding to one predetermined position of the member moved by the eccentric so that the mask and screen may be rectilinearly moved to four predetermined positions.

15. An apparatus of the type described for positioning a combination mask and screen relative to a light sensitized surface comprising a first plate-like member having an opening therethrough, means on said member for removably supporting a combined mask and screen over said opening, a second plate-like member having a central opening, means supporting the first member on the second member and guiding the first member for limited rectilinear movement transversely of said second member and parallel therewith with the openings in said members maintained in communication, a disk having a central opening, means on the said disk supporting the second member thereon and guiding the latter for limited rectilinear movement parallel therewith and at right angles relative to the movement of said first member with the opening of said disk maintained in communication with the openings of said first and second members, means including a manually rockable eccentric mounted on said second member and cooperating with the first member to effect the rectilinear movement of the latter when the said eccentric is rocked, means including a manually rockable eccentric mounted on said disk and cooperating with the second member for effecting the rectilinear movement of the latter when the last-mentioned eccentric is rocked, a frame member having a central opening, means rotatably supporting said disk on said frame member with their openings in communication, and means for releasably locking said disk to said frame member, whereby the said mask and screen may be sequentially rectilinearly moved relative to the frame member so as to occupy predetermined positions disposed in rectangular arrangement and may also be rotated to a desired angular position relative to the frame member.

16. An apparatus of the type described for positioning a combination mask and screen relative to a light sensitized surface comprising a first plate-like member having an opening therethrough, means on said member for removably supporting a combined mask and screen over said opening, a second plate-like member having a central opening, means supporting the first member on the second member and guiding the first member for limited rectilinear movement transversely of said second member and parallel therewith with the openings in said members maintained in communication, a disk having a central opening, means on the said disk supporting the second member thereon and guiding the latter for limited rectilinear movement parallel with the disk and at right angles relative to the movement of said first member with the opening of said disk maintained in communication with the openings of said first and second members, means including a manually rockable eccentric mounted on said second member and engaging the first member to effect the rectilinear movement of the latter to either of two spaced predetermined positions, means including a manually rockable eccentric mounted on said disk and cooperating with the second member for effecting the rectilinear movement of the latter to either of two spaced predetermined positions, a frame member having a central opening, means rotatably supporting said disk on said frame member with their openings in communication, means for releasably locking said disk to said frame member, means for removably supporting a body having a light sensitized surface in a position parallel with said frame member, and means for varying the distance between said frame member and the means supporting said body while maintaining the parallel relationship therebetween, whereby the said combined mask and screen may be sequentially rectilinearly moved relative to the body with the light sensitized surface so as to occupy any of four predetermined positions disposed in rectangular arrangement, and the said mask and screen may also be rotated to a desired angular position while supported at a desired distance from the said body.

WILLIAM CARL HUEBNER.

References Cited in the file of this patent

UNITED STATES PATENTS

| Number | Name | Date |
|---|---|---|
| 1,060,982 | Huebner | May 6, 1913 |
| 1,471,773 | Bowen | Oct. 23, 1923 |
| 1,654,070 | Corlett | Dec. 27, 1927 |
| 1,911,142 | Cahill | May 23, 1933 |